United States Patent
Fourcher et al.

(10) Patent No.: US 9,116,896 B2
(45) Date of Patent: Aug. 25, 2015

(54) NONLINEAR PROXY-BASED EDITING SYSTEM AND METHOD WITH IMPROVED MEDIA FILE INGESTION AND MANAGEMENT

(75) Inventors: Fredric Jon Fourcher, Corona Del Mar, CA (US); Daniel O. Pugh, Long Beach, CA (US); Kyle R. Miller, Tustin, CA (US)

(73) Assignee: BITCENTRAL, INC., Newport Beach, CA (US)

(*) Notice: Subject to any disclaimer, the term of this patent is extended or adjusted under 35 U.S.C. 154(b) by 569 days.

(21) Appl. No.: 13/436,891

(22) Filed: Mar. 31, 2012

(65) Prior Publication Data

US 2013/0262381 A1 Oct. 3, 2013

(51) Int. Cl.
G06F 7/00 (2006.01)
G06F 17/30 (2006.01)
G11B 27/034 (2006.01)
H04N 21/854 (2011.01)

(52) U.S. Cl.
CPC ...... *G06F 17/30058* (2013.01); *G06F 17/3002* (2013.01); *G11B 27/034* (2013.01); *H04N 21/854* (2013.01)

(58) Field of Classification Search
CPC .. G06F 17/3002; H04N 21/854; G11B 27/02; G11B 27/034
See application file for complete search history.

(56) References Cited

U.S. PATENT DOCUMENTS

| | | | |
|---|---|---|---|
| 5,940,573 A | 8/1999 | Beckwith | |
| 6,154,600 A * | 11/2000 | Newman et al. | 386/281 |
| 6,445,874 B1 | 9/2002 | Catlow | |
| 6,453,321 B1 * | 9/2002 | Hill et al. | 1/1 |
| 6,801,918 B1 | 10/2004 | Mizuno | |
| 7,103,260 B1 | 9/2006 | Hinson | |
| 7,685,192 B1 * | 3/2010 | Scofield et al. | 707/709 |
| 7,814,095 B2 * | 10/2010 | Ireland | 707/718 |
| 7,970,260 B2 * | 6/2011 | Haot et al. | 386/278 |
| 8,429,205 B2 * | 4/2013 | Rhoads | 707/809 |
| 8,429,505 B2 * | 4/2013 | Takaku | 714/776 |
| 8,755,673 B2 * | 6/2014 | Gilley | 386/278 |
| 2005/0025454 A1 | 2/2005 | Nakamura | |
| 2006/0156219 A1 * | 7/2006 | Haot et al. | 715/500.1 |
| 2006/0253542 A1 * | 11/2006 | McCausland et al. | 709/207 |
| 2008/0212933 A1 | 9/2008 | Cawley | |
| 2011/0125818 A1 * | 5/2011 | Liebman | 707/829 |
| 2011/0191320 A1 * | 8/2011 | Glover | 707/706 |
| 2012/0084404 A1 * | 4/2012 | Haot et al. | 709/219 |

OTHER PUBLICATIONS

"QTube Global Media Workflow" Trevor Francis, Quantel; Quantel Whitepaper, Issue 1.0, Nov. 2010.

* cited by examiner

*Primary Examiner* — Jeffrey A Burke
(74) *Attorney, Agent, or Firm* — Roberts Mlotkowski Safran & Cole, P.C.

(57) ABSTRACT

A proxy-based, non-linear editing system is provided having simplified source file ingestion. The system includes a source file repository that stores media source files copied from a plurality of memory cards from video cameras; a proxy file generator that generates and stores a compressed low-resolution proxy of media source files copied into the source file repository; both an editing station and an ingestion station including a web browser having a display screen, and at least one interactive digital processor that coordinates the interaction between the source file repository, proxy file generator, and editing and ingestion stations. In operation, the digital processor automatically generates a proxy file and a thumbnail of each media source file copied into one of the card folders, and makes the proxy file and thumbnail immediately ready for editing on the web browser of the editing station.

19 Claims, 12 Drawing Sheets

FIGURE 5C

NONLINEAR PROXY-BASED EDITING SYSTEM AND METHOD WITH IMPROVED MEDIA FILE INGESTION AND MANAGEMENT

FIELD

This invention generally relates to nonlinear editing systems for audio-visual media files, and is particularly concerned with a proxy-based, nonlinear editing system and method with improved media file ingestion and management for improving work efficiency.

BACKGROUND

Nonlinear editing (NLE) systems are well known in the prior art, and are used for example in the news rooms of television broadcasting stations to assemble video clips for news stories from a variety of different electronic media files. As the name implies, NLE systems enable direct access to any frame in a digital video clip without the need to play or shuttle through adjacent footage to reach it, as was necessary with older videotape editing systems. In operation, all of the raw or source media files associated with a particular news story are imported into a source media repository. This is typically accomplished by connecting the removable memory media of a file-based digital video camera to the memory card reader of a computer. The removable memory media may take the form of solid state electronic memory devices, hard disks, or removable disks, but will hereafter be referred to as memory cards. A user inserts the memory card from the camera into the card reader of a computer and copies the file contents of the memory card into shared local or network file storage which will hereafter be referred to as a repository. The editor reviews the source media files associated with the particular news story on the viewing screen of an editing terminal and generates an Edit Decision List (EDL) which specifies which parts of which clips are connected and in what order. The final clip is created by selective electronic copying and pasting together portions of the source media files stored in the repository. This process may also include the application of various digital effects such as filters, dissolves, fades, or image overlays.

NLE systems obviate the need for the time-consuming act of mechanically cutting and splicing together the originals of the video tape or film negatives. Moreover, because the EDL is executed only on copies of the source media files, no portion of the source media files stored in the repository is destroyed or changed as a result of the editing operation. Hence the source media files stored in the repository may be re-edited into as many different versions as desired.

Proxy-based NLE systems are also known in the prior art. Such systems were developed upon the realization that it is not necessary for the editor to view the original high definition, high-bandwidth media file in generating the EDL. Instead, a low-resolution proxy file may be used for such purposes. In operation, the low-resolution proxy file is generated and stored soon after the raw, high-resolution media file is exported into the source media repository of the system. The low bandwidth of such proxy files allows common, inexpensive web browsers to replace the relatively expensive, high-bandwidth editing terminals associated with non proxy-based NLE systems. The ability of such proxy media files to be easily and quickly downloaded, uploaded and viewed over local networks or the broader Internet conveniently allows an editor to efficiently generate an EDL from any web-connected location via a laptop or desk top computer.

SUMMARY

Despite the many advantages associated with proxy-based NLE systems, the applicants have observed a number of shortcomings in such prior art systems that prevent them from realizing their full potential in improving the work efficiency of the media editor. In particular, the applicants have observed that the editor must manually create and import the proxy files associated with a particular news story before the editing process can begin. To do this, the editor must first find locate the hard disc(s) within the NLE system where the pertinent video memory cards were copied. The editor must then navigate to these hard discs and open the files copied from the memory cards. The editor must then locate the raw (or "source") video files located within the file structure contained within the memory card. As the file structure copied from the memory cards is often complicated and confusing, culling out only the video source files from the hierarchical files copied from the memory cards can be cumbersome. Finally, the editor must manually instruct the system to generate a proxy file of every source file related to the particular story of interest. Accordingly, the manual creation and importation of proxy files required by prior art NLE systems is cumbersome and time consuming. Moreover, because the media files generated by many video cameras are designated with the same name (such as "PRIVATE" in the case of JVC file-based broadcast video cameras), and because computer file systems generally prohibit two different files from being stored with the same name within any folder, the user must also manually designate a uniquely-named folder for the contents of each media file during the ingestion process, thus further increasing the amount of time and effort necessary to complete the importation of the relevant proxy files from the repository to the editing station.

To overcome these shortcomings, the NLE system of the invention comprises a source file repository for storing media files from a plurality of file-based sources (which are typically memory cards from video cameras); a proxy file generator that generates and stores a compressed, low-resolution, low-bit rate proxy of media files stored in the source file repository; both an editing station and an ingestion station including a web browser having a display screen; and at least one digital controller interactively connected to the source file repository, the proxy file generator, and the editing and ingestion stations. The at least one digital controller creates a story folder within the source file repository having uniquely-named card folders for receiving copies of all of the media source files contained within one of the memory cards. After the user copies the contents of the memory cards into the card folders at the ingestion station, the at least one digital controller automatically (1) generates a proxy file for each media source file copied into the card folders of the story folder, and (2) makes all of the proxy files associated with the story folder available for editing on the display screen of the editing station. This is preferably implemented by the at least one digital processor automatically making a database record for each video source file copied from the memory card, including file location and metadata.

The at least one digital processor may further automatically generate a small image, such as a thumbnail, to be displayed on the display screen of the editing station, where it will serve to represent the source video clip. The thumbnail will preferably be generated from one of the starting frames of the source vide and be shown on the display screen of the editing station together with a name, video duration, and time code, and the at least one digital processor may arrange the thumbnails of the proxy files on the display screen of the user editing interface in chronological order to facilitate the editing process.

The NLE system of the invention may have three different modes of source file ingestion.

In a first mode of source file ingestion, the user initiates the creation of a new story folder by interacting with a web page on the browser of the ingestion station. The at least one digital processor automatically generates both the requested folder for the story and a pre-selected number of uniquely-named card folders within the story folder as soon as the story folder is created, thereby obviating the need for the user to generate a new card folder for every memory card imported into the story folder. The user then manually imports the contents of each memory card into one of the automatically-made card folders in the new story folder. The system then proceeds to automatically generate proxy files and thumbnails of the source files as previously described.

In a second mode of source file ingestion, the user initiates ingestion by inserting a memory card into the memory card reader of the ingestion station. The ingestion station includes a card monitor that signals the at least one digital processor that a memory card has been inserted into the card reader of the ingestion station. The at least one digital processor displays a window on the display screen of the ingestion station prompting the user to decide whether of copy the memory card into an existing story folder, or generate a new story folder. The at least one digital processor automatically creates a new card folder with a unique name within the selected story folder (whether preexisting or new) and copies the entire contents of the memory card into the new card folder. The process is repeated when the next memory card is inserted into the card reader of the ingestion station. The system then proceeds to automatically generate proxy files and thumbnails of the source files as previously described.

In a third mode of file ingestion, the user initiates ingestion by inserting a memory card into the memory card reader of the ingestion station. The at least one digital processor generates a periodic folder at a preselected time interval which may be, for example, 24 hours. The name of the folder indicates the time at which the folder was created. In this mode of ingestion, each memory card stores a date and time for every file recorded therein, and the at least one digital processor automatically generates a unique card folder within the periodic folder for the contents of each memory card imported into the source file repository. The at least one digital processor automatically identifies and copies those media files on the memory cards that were made within the preselected time period associated with the periodic folder. Each of the media cards may further bear an identifier using the volume label or a file on the memory card (which may be based on the identity of the video camera or cameraman that produced the source file). The at least one digital processor may include the identifier in the name of the periodic folder, thus automatically grouping all of the card folders within the periodic folder containing source files associated with the identifier. Additionally or alternatively, the at least one digital processor may compare the file time of each ingested file, and create story folders to correspond to time periods during which at least one video file exists with a gap of no more than a preselected time period (which may be, for example, 15 minutes). In either case, the card folders grouped together are highly likely to pertain to a same story or event.

The at least one digital processor may also advantageously allow third-party access to source files within the source file repository while avoiding potential conflicts that could occur when third-party software programs apply locks or read-only settings on some of the source files in the repository. In such a case, the at least one digital processor determines on a file-by-file basis which files are being processed by third party software applications and selectively waits to read these files until the third party applications are completed while allowing access to all other source files.

Finally, the at least one digital processor may also automatically relay notifications of the importation of media files from a particular media storage device to persons of interest. This is accomplished by recording an identifier on each memory card used in connection with the NLE system, and storing the identifier in the database server along with a predetermined notification list for each memory card. When a memory card is inserted and a folder is created in the file server, the at least one digital controller is programmed to look up the identifier of the inserted memory card, retrieve the list of e-mail, text, or Instant Message addresses of the persons on the notification list, and to transmit a message to the address indicating that files are being imported into the system. Notifications could be sent when the copying of media starts or when the media copy is finished. This particular feature of the invention may be appended to any one of the three modes of source file ingestion.

DETAILED DESCRIPTION OF THE EMBODIMENTS

Figure 1:
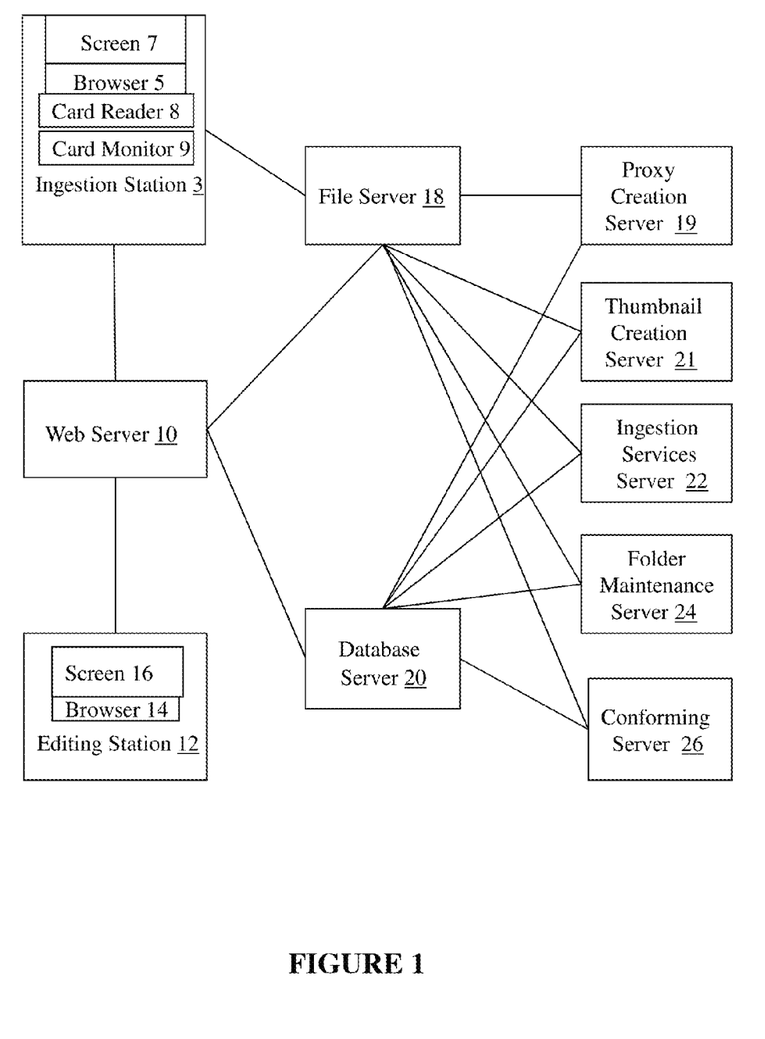
FIG. 1 is a schematic diagram of an example of the NLE system of the invention.

With reference now to FIG. 1, the NLE system 1 of the invention includes an ingestion station 3 that includes a web browser 5, a display screen 7, and a card reader 8 capable of reading media files recorded onto memory cards. The ingestion station 3 further preferably includes a card monitor 9 which senses when a memory card is inserted into the card reader 8. The ingestion station 3 is connected to a web server 10 via a computer communication network. The NLE system 1 further includes an editing station 12 having a web browser 14 and display screen 16 that is likewise connected to the web server 10 as shown. The web server 10 is capable of generating web pages dynamically in response to requests from the browser 5 and browser 14. Such requests will typically require the web server 10 to collect information from other servers in the system 1, and to combine and prepare that data into web pages and data streams that may be used by the browser 5 and browser 14. Both the ingestion pages and the editing page of the system 1 will be described in more detail hereinafter. While the drawing shows only one ingestion station 3 and one editing station 12, it should be noted that an NLE system 1 having a multiplicity of ingestion stations 3 and editing station 12 is within the scope of this invention. Also, while the ingestion stations 3 and the editing station 12 are indicated as separate physical devices, it should be noted that the browser 5 of the ingestion station 3 is capable of presenting the editing web pages and thus may perform all the functions of the editing station.

The system 1 further includes a file server 18 which satisfies requests to store or retrieve files or to provide metadata about files. It is attached via a computer communication network to the ingestion station 3, and web server 10. A proxy creation server 19 is connected to the file server 18 as shown. This server 19 creates a low-definition, low-bandwidth proxy files of media source files imported into the file server 18, and relays the proxy files back to the file server 18 for storage. The proxy creation server 19 is further connected to a database server 20, from which it retrieves "proxy job" instructions that includes the identity of the source file within the file server 18 that the proxy server 19 is to generate a proxy file of and to which it records information about the result of the proxy creation process. A thumbnail creation server 21 is also connected to both the file server 18 and the database server 20. This server 21 creates a thumbnail image to be shown on the display 16 of the editing station 12 that helps the editor identify the subject matter of a particular source file that a proxy file has been generated for and stores it on the file server 18. The thumbnail typically includes a still image made from one of the beginning frames of the source file. Like the proxy creation server 19, the thumbnail creation server 21 retrieves "thumbnail job" instructions from the database server 20 that include the identity of the source file within the file server 18 that the server 21 is to generate an icon or thumbnail of.

Further included within the NLE system 1 are both an ingestion services server 22 and a folder maintenance server 24. Both of these servers 22 and 24 are connected to the file server 18 and the database server 20. The ingestion services server 22 includes software that instructs it to (1) continuously monitor new source files copied into the file server 18, (2) make a record in the database server 20 of the name and location of each new source file found, (3) create a "proxy job" for each media file in the memory card, and store the "proxy job" in the database server 28, (4) create an "icon job" for each media file in the memory card and store the "icon job" in the database server 20, (5) make a "media set" record in the database server 20 that contains references to the source file, its associated proxy file, and its associated thumbnail file, such that the locations of the files on the file server 18 can later be resolved, and (6) automatically relay the completed proxy files and thumbnail from the file server 18 to the editing station 12 via the web server 10. The folder maintenance server 24 includes software to maintain the basic structure of the folders on the disc of the file server 18 to match the folder identifiers and locations stored in the database server 20.

Finally, the NLE system 1 of the invention includes a conforming server 26. The conforming server 26 receives the Edit Decision List (EDL) generated by the user at the editing station 12 which specifies which parts of which clips within the source files are connected and in what order. It may further specify what if any special audio or video transformations or effects are to be applied to create the desired output. Conforming server 26 then implements the EDL by selectively copying portions of the source files within the file server 18 and stringing these copied portions together in accordance with the instructions in the EDL. The edited story version is again stored in the file server under a unique name and location. Advantageously, the original source files stored in the file server 18 remain entirely intact no matter how many edited versions are generated from them.

Figure 2A:
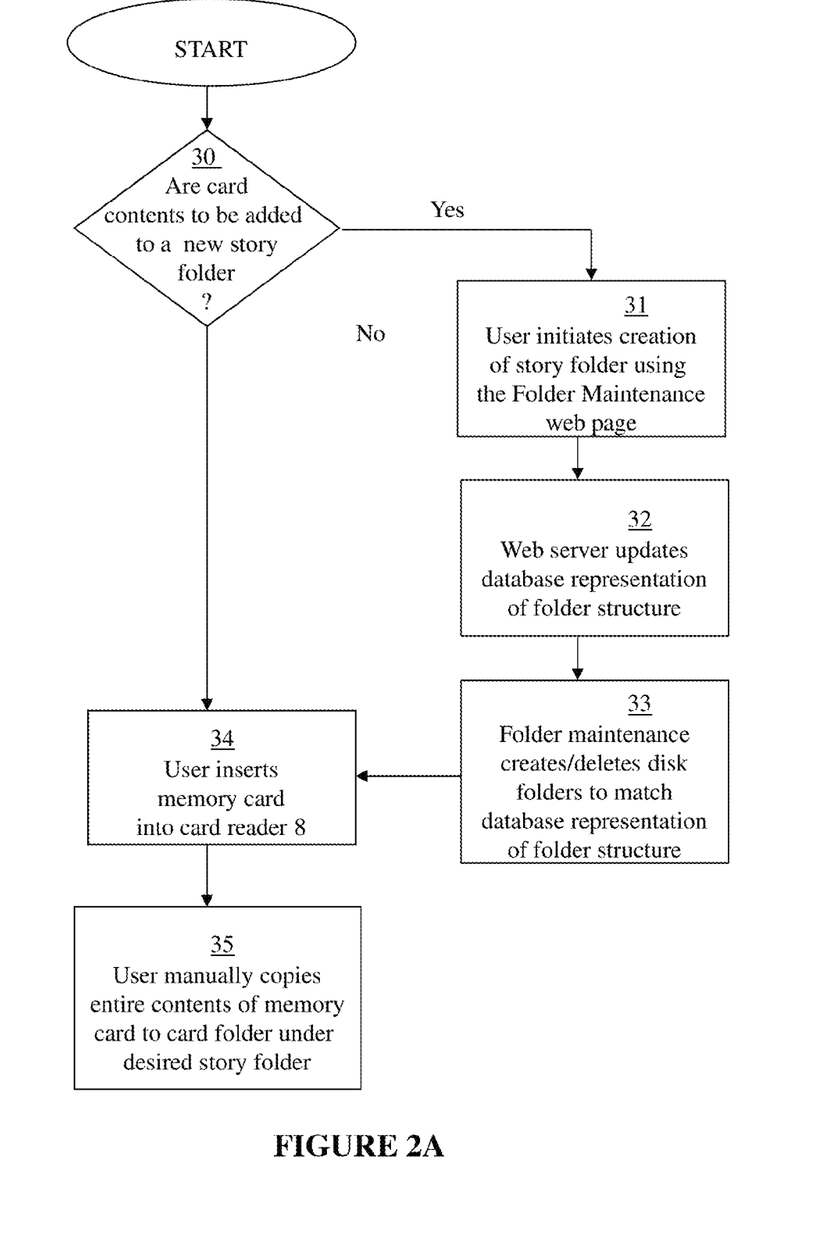
FIG. 2A is a flowchart illustrating how the user interacts with the NLE system in the manual mode of file ingestion in which the user optionally initiates the creation of a story folder, then copies the contents of a memory card into an empty card folder under the selected story folder.

The operation of the manual mode of media file ingestion will now be described with respect to FIG. 2A. In this mode of operation, the user first determines whether the contents of the memory card will be copied to a card folder of an existing story folder or whether it will be copied to a new story folder as shown in block 30. In the latter case, the user names and inserts a new story folder into a desired location in the file server 18 using the folder maintenance web page as shown in block 31. This causes the web server 10 to insert a record for the new story folder into the database server 20 as shown in block 32. The folder maintenance server 24 subsequently reads that record and updates the folder structure on the disk of the file server 18 to include the new story folder in accordance with block 33. The user then inserts a memory card from a video camera into the card reader 8 of the ingestion station 3 as shown in block 34. The user then manually copies the contents of the memory card into the selected card folder as indicated in block 35. This may be done using an operating system facility such as Windows® Explorer.

Figure 4A:
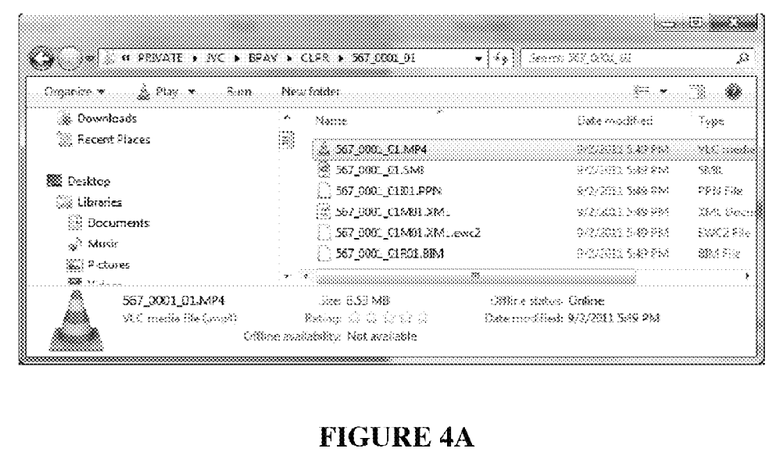
FIG. 4A is a screen shot of Windows® Explorer showing part of the contents of an SD card.
Figure 4B:
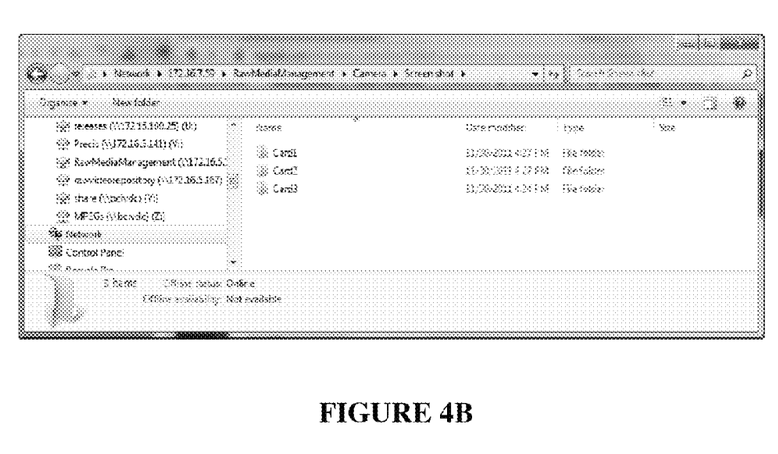
FIG. 4B is a screen shot of Windows® Explorer showing the card folders that are automatically generated when the user creates and names a new folder, and into which the user may drop a complete folder dragged from the SD Card.
Figure 4C:
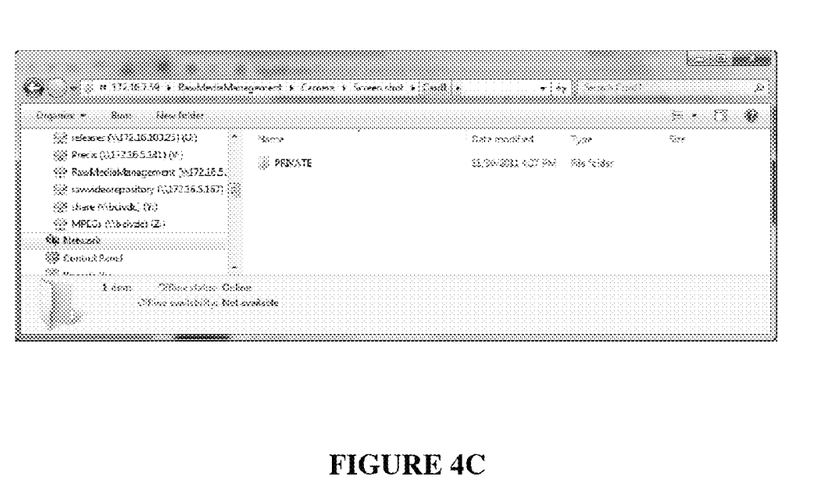
FIG. 4C is a screen shot Windows® Explorer showing the contents of "Card1" folder of the new folder after the contents of the memory card have been imported therein.
Figure 4D:
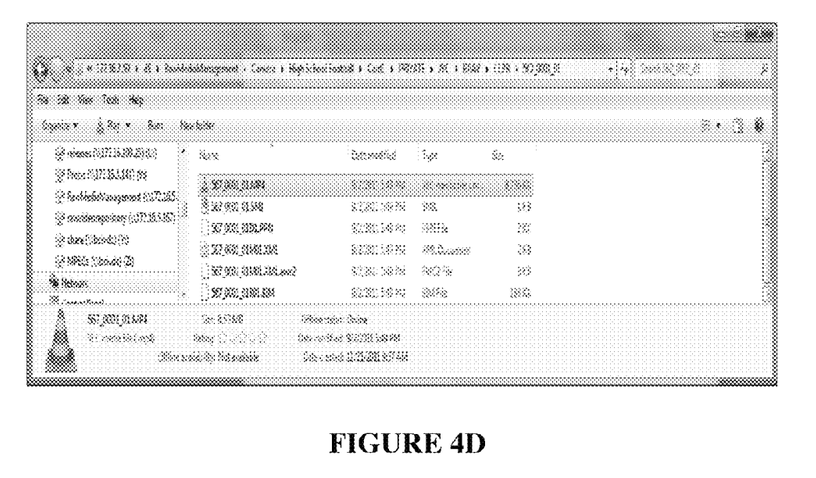
FIG. 4D is a screen shot of Windows® Explorer showing the source and other files in the story folder within the repository after the contents of the memory card have been imported thereto.

Several screen shots of the folders as would be viewed in Windows® Explorer are shown in FIGS. 4A-4D. FIG. 4A shows the structure of the media source files and other source files within the folder hierarchy created on the memory card by the video camera. FIG. 4B is a screen shot of the ingestion page showing how three uniquely named card folders are automatically generated within the story folder named "Screen shot" by the user. FIGS. 4C and 4D represent the type of folder displays the user at the ingestion station 3 would see if he opened the Card1 folder of the "Screen Shot" folder after all of the files in the memory card had been imported into the file server 18. If the user should open the Card1 folder by clicking on it, he would obtain the display shown in FIG. 4C indicating that JVC-named folder "Private" is now in the Card1 folder. If the user should further open the "Private" folder, he would get the display shown in FIG. 4D, indicating the folder structure of the hierarchical files contained within the memory card. Note that the display of FIG. 4D is the same as 4A, indicating that the entire file contents of the memory card has been imported into the file server 18. In this particular example, the file contents displayed in FIG. 4A have also been clicked and dragged into the Card2 folder shown in FIG. 4B for a purpose that will become evident hereinafter.

Note that the folder hierarchy is copied completely from the memory card to the card folder because the hierarchy of folders itself, and metadata files (aside from the source files it contains) are used by the one or more digital processors to determine information such the type of video camera that generated the file contents, and the time and date that the file contents were recorded.

Figure 2B:
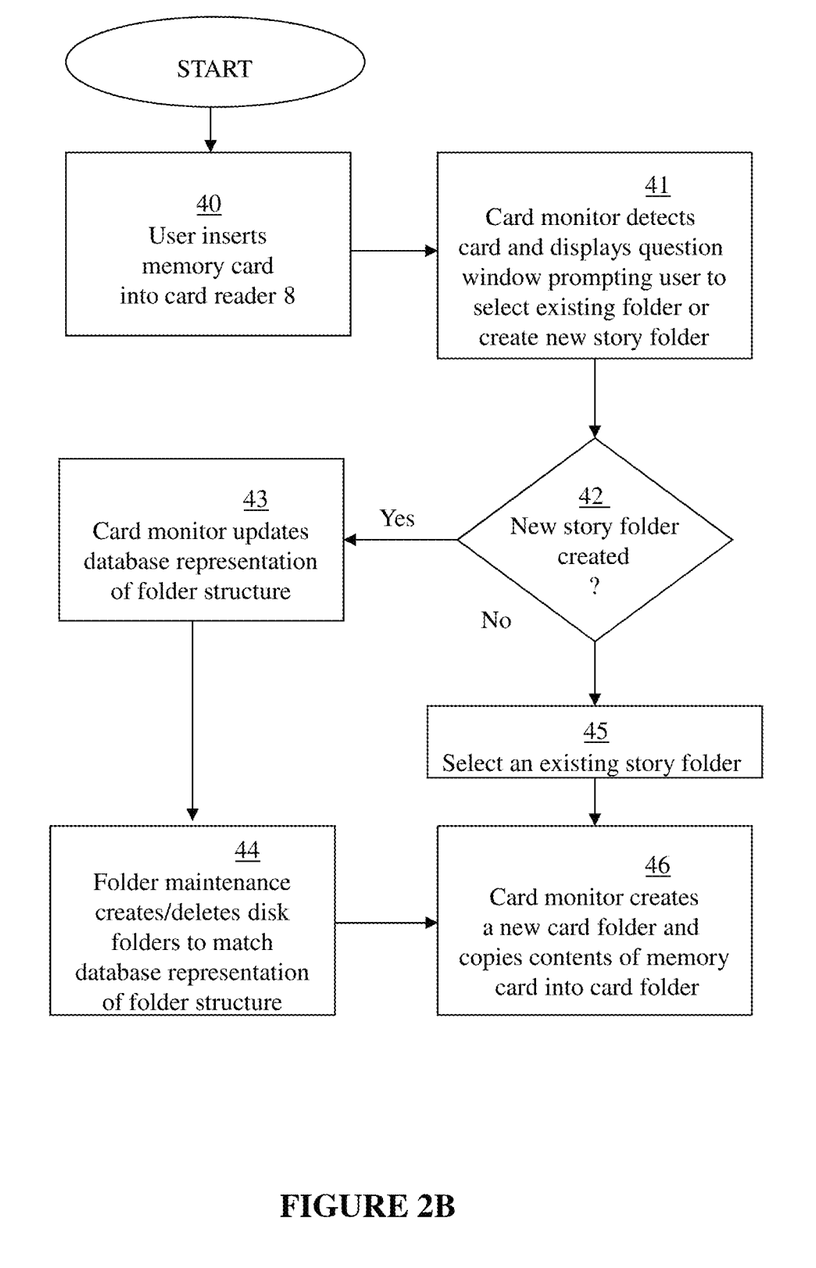
FIG. 2B is a flowchart illustrating how the user interacts with the NLE system in the Semi-automatic mode of file ingestion which eliminates the manual import step associated with the manual mode of source file ingestion in which the user first inserts a memory card into the card reader of the ingestion station, then the card monitor detects the insertion of the card and presents to the user a window prompting the user to either choose from among existing folders or to create a new folder, then in the case of a new folder the agent creates the new story folder, then the agent creates a new empty card folder under the new or selected existing story folder, then the agent copies all the contents of the memory card into said card folder.

The operation of the semiautomatic mode of media file ingestion will now be described with respect to FIG. 2B. After the user plugs the memory device into the card reader 8 as shown in block 40, the card monitor 9 of the system 1 detects the insertion of the card and displays a window prompting the user to either select an existing story folder or to enter a name for a new story folder as shown in block 41. The user then decides to either create a new story folder or not as indicated in block 42. If the user creates a new story folder, the card monitor 9 updates the representation of the folder structure in the database server 20, and the folder maintenance server 24 creates or deletes the folders on the file server 18 to match the representation of the folders in the database server 20, as shown in blocks 43 and 44. If the user does not create a new story folder, he selects an existing story folder as shown in block 45. In both cases, the card monitor 9 creates a new card folder in either the new or preexisting story folder and copies the contents of the memory card into the new card folder as shown in block 46. Note that the card monitor 9 is a software component that is installed on the ingestion station 3 to enable semiautomatic (as well as automatic) file ingestion. If the card monitor 9 is not installed on the ingestion station 3, then only manual ingest is possible.

Figure 3A:
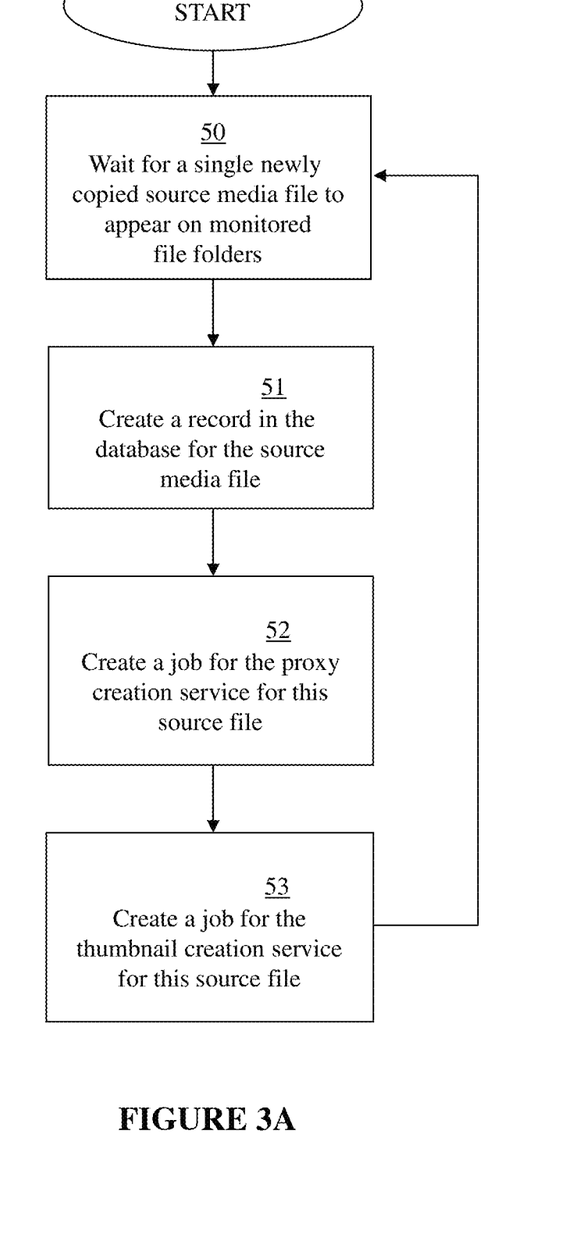
FIG. 3A is a flowchart illustrating the operation of the ingest service, which waits for a newly copied source file, then updates the database with a record to represent said source file, then creates jobs for the proxy and thumbnail services, then waits again, repeating the cycle continuously during the operation of the system 1.

The basic operation of the ingestion service is shown in FIG. 3A. The ingestion services server 22 is continuously monitoring the file server 18 for newly imported media source files as indicated by block 50. As soon as a proxy job media source file has been completely copied into the file server 18, the ingestion services server 22 finishes waiting in block 50 and advances to block 51 where it makes a record in the database server 20 of the name and location of the new source file found. Then it advances to block 52 where it creates a "proxy job" and to block 53 where it creates a "thumbnail job" for the new source file. Both of the types of jobs are stored in the database server 20.

Figure 3B:
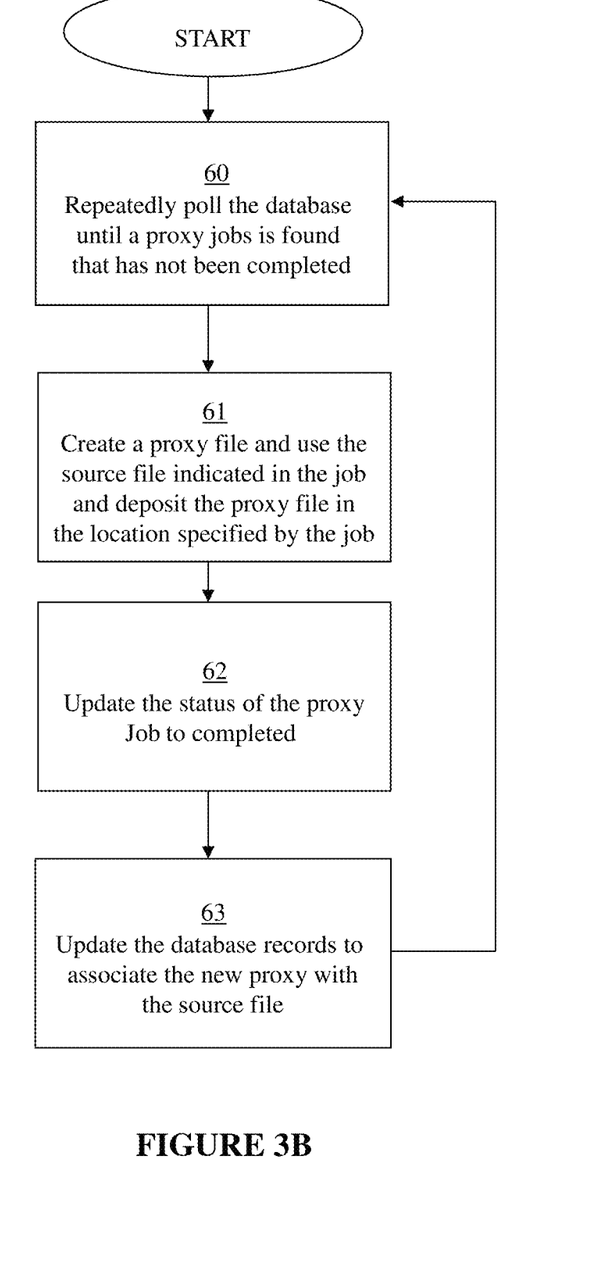
FIG. 3B is a flowchart illustrating the operation of the proxy creation service, which waits for a thumbnail job on a queue, then creates a proxy file in accordance with the contents of the job, then updates the status of the proxy job to indicate its completion, then updates the database records to associate the new proxy file with the source file.

The basic operation of the proxy creation server 19 is shown in FIG. 3B. The proxy creation server 19 continuously monitors the database server 20 for new proxy jobs as shown in block 60. As soon as a proxy job is found that has not previously been completed, the proxy creation server 19 finishes waiting in block 60 and advances to block 61 where it creates a proxy according to the job record. The job record specifies both the source file to be used to create the proxy and the output location to which the finished proxy file should be stored. The proxy file will generally be stored to the file server 18. Block 62 shows that the proxy creation server 19 then updates the job record in the database to indicate that the job was completed. This will prevent the job from being retrieved again in the future. Next in block 63, the proxy creation server 19 updates the media set record in the database to establish the relationship between the newly-created proxy file and the original source file. After this, the process repeats, starting again at block 60.

Figure 3C:
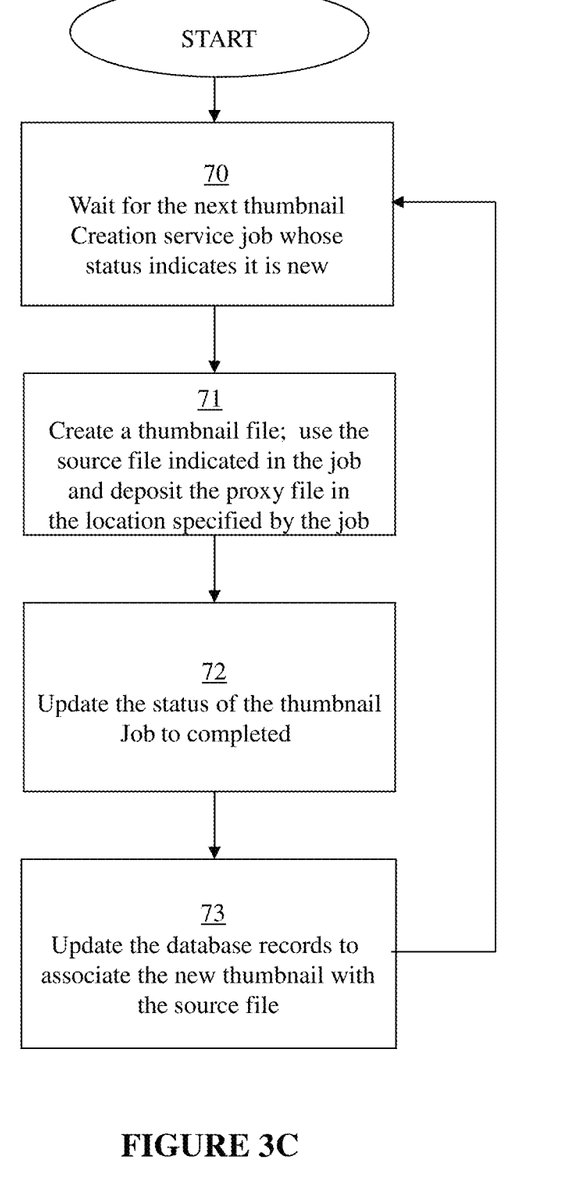
FIG. 3C is a flowchart illustrating the operation of the thumbnail creation service, which waits for a thumbnail job on a queue, then creates a thumbnail file in accordance with the contents of the job, then updates the status of the thumbnail job to indicate its completion, then updates the database records to associate the new thumbnail file with the source file.

The basic operation of the thumbnail creation server 21 is shown in FIG. 3C. In a way entirely analogous to the proxy creation server 19, the thumbnail creation server 21 continuously monitors the database server 20 for new thumbnail jobs. As soon as a thumbnail job is found that has not previously been completed, the thumbnail creation server 21 finishes waiting in block 70 and advances to block 71 where it creates a thumbnail according to the job record. The job record specifies both the source file to be used to create the thumbnail and the output location to which the finished thumbnail file should be stored. The thumbnail will generally be stored to the file server 18. Block 72 shows that the thumbnail creation server 21 then updates the job record in the database to indicate that the job was completed. This will prevent the job from being retrieved again in the future. Next in block 73, the thumbnail creation server 21 updates the media set record in the database to establish the relationship between the newly created thumbnail file and the original source file. After this, the process repeats, starting again at block 70.

Figure 4E:
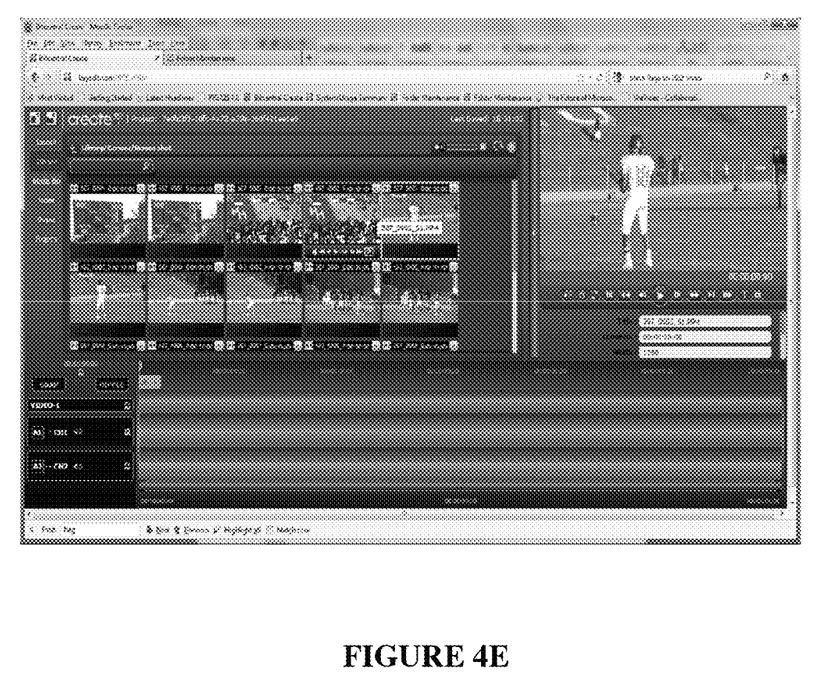
FIG. 4E is a screen shot of the thumbnails displayed for each of the source videos when the user clicks the folder icon.

As soon as the proxy file and thumbnail are generated, stored in the file server 18, and the media set is updated in the database, the source file becomes available to be viewed and used as an edit source on the browser 14 of the editing station 12. The user sees a thumbnail for each source video together with the file name of the source video as shown in FIG. 4E. The thumbnails are displayed on the editing page shown on the screen 16 in the form of a folder icon that is given the same name as the folder to which the proxy files and thumbnails belong. When the user clicks the folder icon, the thumbnails are displayed across the screen 16 in the manner illustrated in FIG. 4E. In this particular example of the invention, the contents of a same memory card has been imported to both the Card1 folder and the Card2 folder of the "Screen Shot" folder, as previously indicated, in order to demonstrate how the system 1 can manage identical files that were initially designated with the same name (i.e. "Private") easily and without the time-consuming steps that otherwise would be necessary in order to overcome the limitation in Windows® operating systems that no two files in the same folder can have the same name. From a user perspective this is beneficial as it may be desirable to associate multiple SD cards under the same named location in the user interface despite having come from different physical SD cards.

Figure 5A:
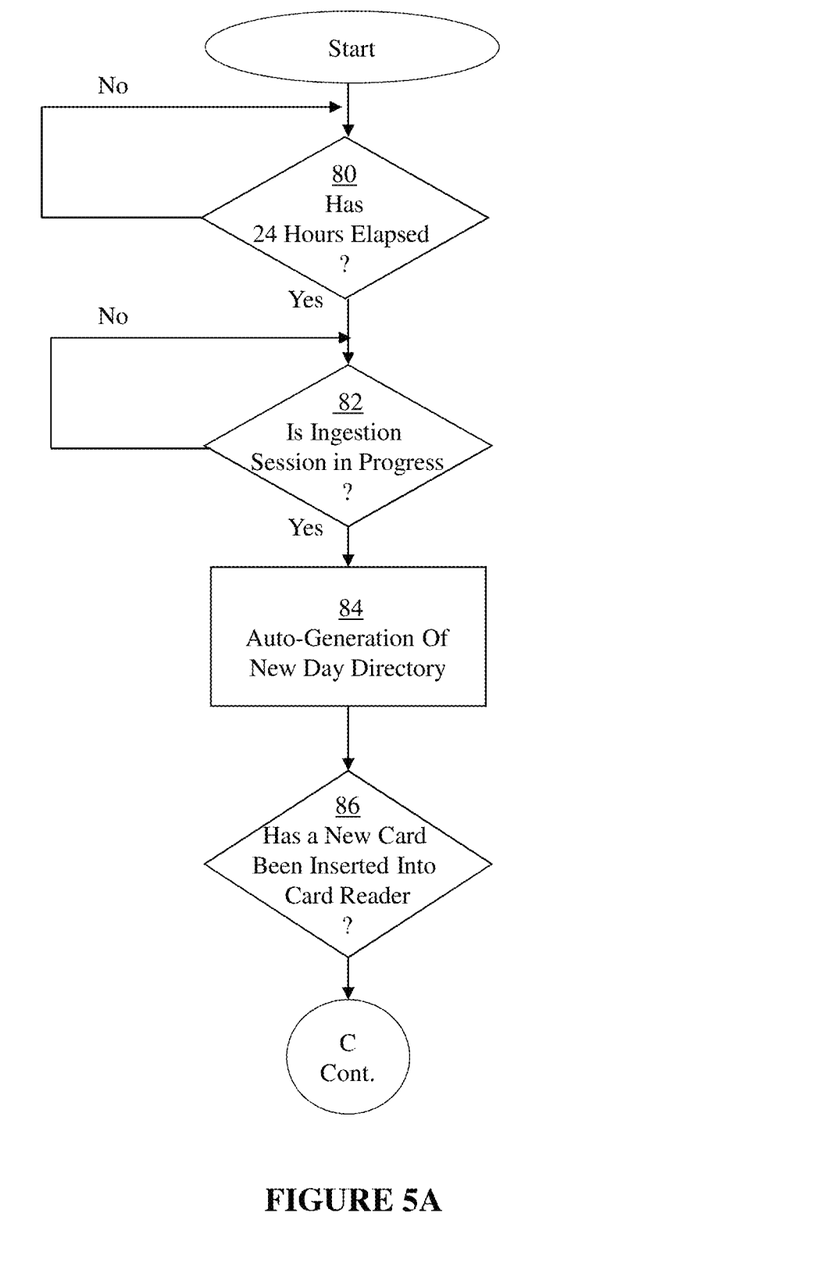
FIGS. 5A-5C are a flowchart illustrating a fully automatic mode of source file ingestion.
Figure 5B:
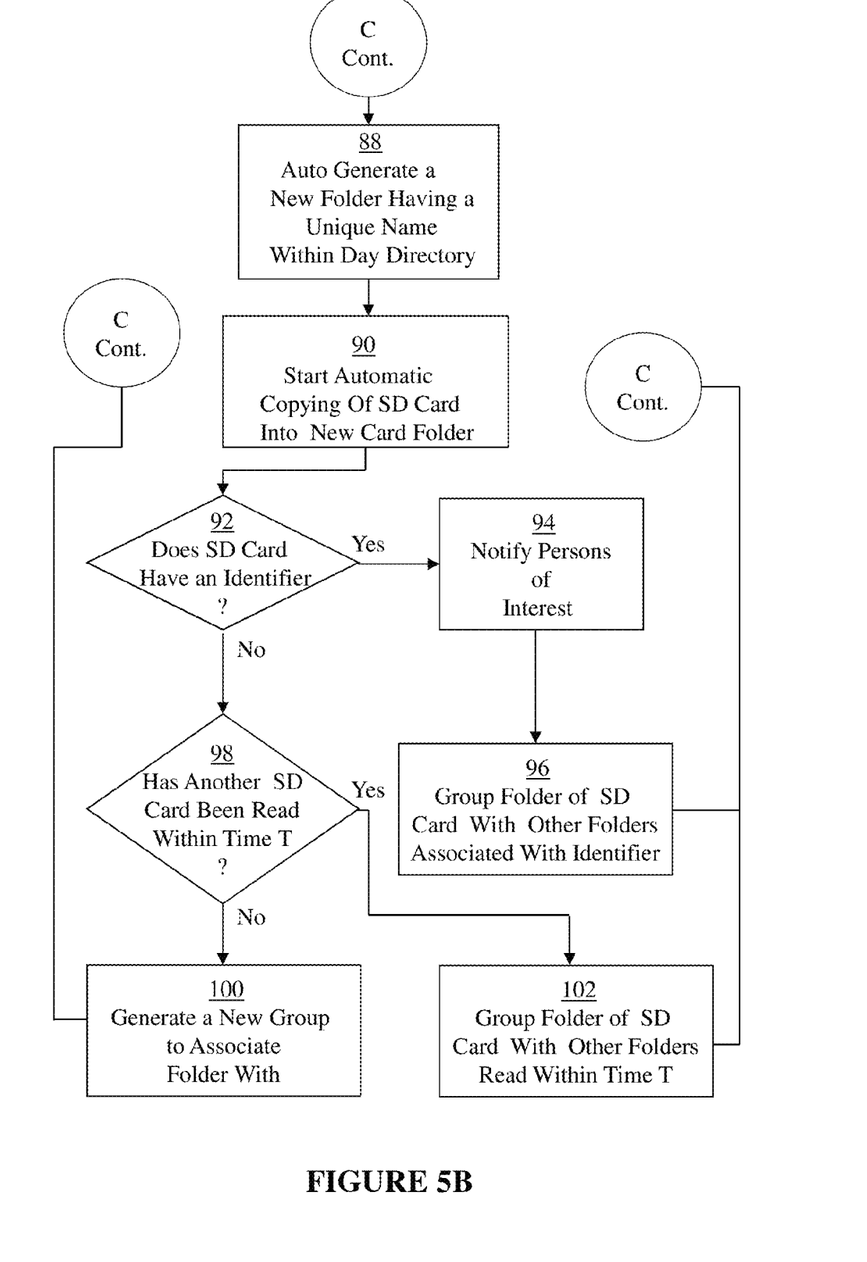
Figure 5C:
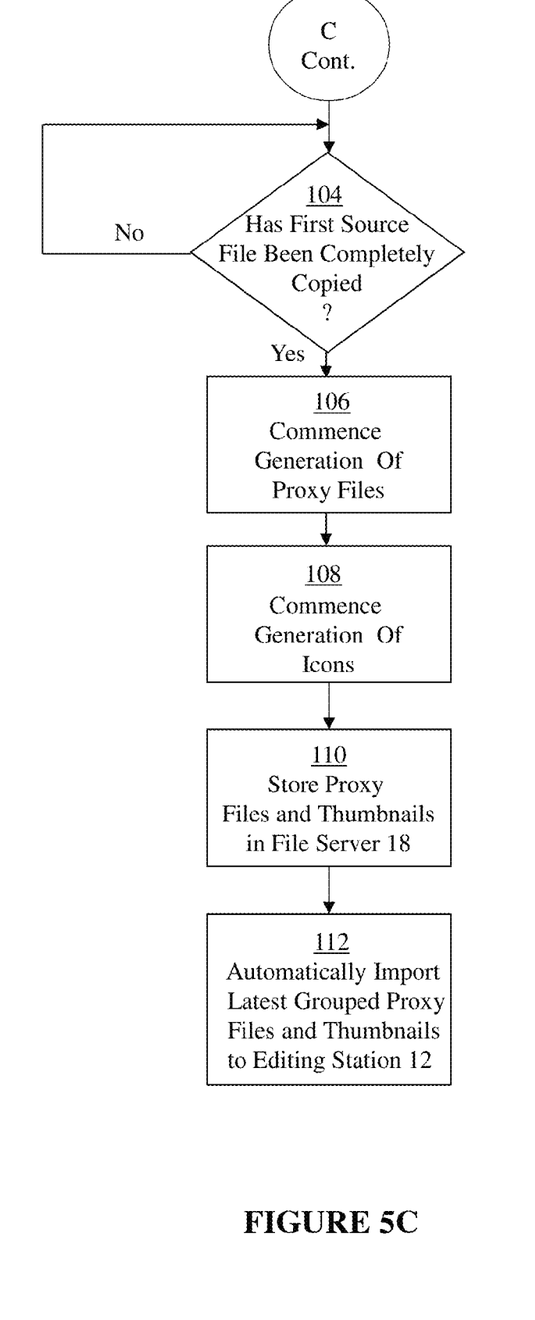

FIGS. 5A-5C are a flowchart of an automatic mode of ingestion operation that the user may also select at the beginning of the ingestion operation. In this mode of operation, the system 1 automatically generates a new folder at a preselected time interval. In this mode of operation, the user simply plugs in a batch of memory cards into the card reader 8 of the ingestion station 3 without calling up the ingestion page or creating and naming a new folder. The system then groups together source files folders likely to be related to a same story or event by either or both of grouping together all of the source files associated with (1) a particular identifier, or (2) where the ending and beginning times of the source files within the folders differ by less than a preselected time period. The grouping together of all source files according to a particular identifier relies on the fact that many memory cards contain information that allows them either directly or indirectly to be identified with a particular cameraman or news crew. Some memory cards include a number corresponding to a particular individual, while other cards include individual identifying number that can be associated with either an individual, an specific camera, or news crew via a registry present within the file server 18. The grouping together of folders containing source files that were recorded within a relatively short time from one another brings together source files that are likely to be associated with a same story or event. Those source file folders which include both the source files that were recorded within a relatively short time from one another and which were also recorded by the same persons or cameras or news crews are very likely to relate to the same story or event.

The automatic mode of ingestion obviates the need for the user to generate a new folder at the beginning of the ingestion process. It accomplishes this by automatically generating a new folder at a selected time interval, which in this example is every 24 hours, as indicated by block 80. However, in order to avoid a situation where source files belonging to a same news story are divided between two folders, the system 1 asks, in block 82, whether an ingestion session is in progress. The system 1 could determine the answer to this question by asking when the last memory card was plugged into the card reader 8. If this time period is greater than a preselected time (such as 15 minutes in this example) then the system 1 would answer the question in the affirmative, and generate a new "day folder" in accordance with block 84. However, if the answer to this question was "no", then the system would revert back to block 82 and defer generating a new "day folder" until it determined that the ingestion session was over.

After a new "day folder" has been generated, the system 1 continuously monitors whether a new card has been inserted into the card reader 8 of the ingestion station 3 in accordance with block 86. If the answer to this question is "yes" then the ingestion services server 22 generates a new, uniquely named folder (such as Card1, Card2, etc.) and installs this folder into the file server 18, as indicated by block 88. The system 1 then automatically starts copying all of the files in the newly plugged-in memory card into the new folder as indicated in block 90. Once the copying process begins, the system 1 further inquires whether there is an identifier within the files and metadata being copied into the newly-made folder as shown in block 92. As indicated earlier, such an identifier might be a number, name or alpha-numeric term that either directly identifies a specific cameraman, camera or news crew, or indirectly identifies such via a registry or directory. The registry or directory may be within the system (for example within the file server) or it might be available over the internet through the web server 10.

If the answer to the inquiry of block 92 is "yes", then the system automatically notifies persons of interest (such as the editors of various news agencies) from a preselected list of such persons existing within or available to the system 1. The notification may be accomplished via e-mail, text-messaging or any other type of electronic communication. Such notification advantageously puts such persons on immediate alert that that source files of interest are in the process of being ingested into the system 1, and would allow, for example, a newsroom editor to begin assembling various related video clips into a ready-to-broadcast news story in the shortest time possible. After (or simultaneously with) the notification operation of block 94, the system 1 automatically groups folders containing files associated with a particular identifier as indicated in block 96. Such grouping is one of the two factors used by the system in deciding which folders in the day folder are related to a same story.

If the answer to the inquiry in block 92 is "no" the system 1 inquires whether the source files of the last-read memory card were recorded within a predetermined period of time T from the recordation of the first frame of the presently-read card, as shown in block 98. This operation is facilitated by the fact that all memory cards associated with video cameras associate a specific time and date with each video frame. Hence the system compares the time and date of recordation of the last frame of the last-read card with the time and date of the recordation of the first frame in the presently-read card. If the time period between these recordation times is greater than a predetermined time of, for example 15 minutes, the answer to this inquiry is "no", then the system 1 operates under the assumption that the source files contained within the two memory cards do not relate to the same news story. The system 1 will then proceed to generate a new group to associate the folder with as indicated in block 100. If the time period between these recordation times is less than the predetermined time of, for example 15 minutes, then the system 1 will group together the folders associated with these two cards on the assumption that the source files in both folders relate to the same news story, as indicated in block 102.

Once these steps have been completed, the system 1 will then executes steps 104-110, which are equivalent to previously described steps 50-73. Finally, the system will automatically import the proxy files and thumbnails to the editing station that are associated with either (1) the single folder group established in step 100, or (2) one or both of the groups of folders assembled in steps 96 and 102, as indicated in block 112.

While the invention has been described in detail with particular reference to certain preferred embodiments thereof, it will be understood that variations and modifications can be effected within the spirit and scope of the invention, which is limited only by the appended claims and equivalents thereof.

The invention claimed is:

1. A non-linear editing system, comprising:
   a source file repository that stores media source files copied from a plurality of memory cards;
   a proxy file generator that generates and stores a compressed low-resolution, low bit rate proxy of media source files stored in the source file repository;
   an editing station including a web browser having a display screen;
   an ingestion station including a web browser having a display screen and a memory card reader; and
   at least one digital processor interactively connected to the source file repository, the proxy file generator, the editing station and the ingestion station that automatically generates a proxy file of each media source file copied into one of the card folders, and makes the proxy file available for editing on the display screen of the editing station,
   wherein the at least one digital processor further automatically creates a database record associating each ingested source file with its corresponding proxy file, and further automatically generates a thumbnail image of the media source file, and associates it with the source file by means of the database record.

2. The non-linear editing system defined in claim 1, wherein the thumbnails are displayed on the editing station together with the source file name.

3. The non-linear editing system defined in claim 1, wherein the digital processor arranges the thumbnails of the proxy files on the screen of the user editing interface in a chronological order.

4. A non-linear editing system, comprising:
   a source file repository that stores media source files and accompanying metadata files copied from a plurality of memory cards;
   a proxy file generator that generates and stores a compressed low-resolution, low bit rate proxy of media source files stored in the source file repository;
   an editing station including a web browser having a display screen;
   an ingestion station including a web browser having a display screen and a memory card reader; and
   at least one digital processor interactively connected to the source file repository, the proxy file generator, the editing station and the ingestion station that automatically generates a proxy file of each media source file copied into one of the card folders, and makes the proxy file available for editing on the display screen of the editing station,
   wherein the at least one digital processor actuates the proxy file generator to generate a proxy file of a media source file as soon as each source file has been completely imported into the source file repository, and associates information from an accompanying metadata file with the media source file.

5. A non-linear editing system, comprising:
   a source file repository that stores media source files copied from a plurality of memory cards;
   a proxy file generator that generates and stores a compressed low-resolution, low bit rate proxy of media source files stored in the source file repository;
   an editing station including a web browser having a display screen;
   an ingestion station including a web browser having a display screen and a memory card reader; and
   at least one digital processor interactively connected to the source file repository, the proxy file generator, the editing station and the ingestion station that automatically generates a proxy file of each media source file copied into one of the card folders, and makes the proxy file available for editing on the display screen of the editing station,
   wherein the at least one digital processor creates a story folder within the source file repository having one uniquely named card folder for each of the memory cards to be imported.

6. The non-linear editing system defined in claim 5, wherein the at least one digital processor automatically generates a same number of uniquely-named card folders in the story folder as the number of memory cards with related content that are copied.

7. The non-linear editing system defined in claim 5, wherein the ingestion station includes a card monitor that signals the at least one digital processor whenever a new memory card is connected to the card reader, and wherein the at least one digital processor automatically generates a new uniquely named card folder within either a preexisting or a newly generated story folder and then automatically proceeds to copy the file contents of the memory card into the new card folder.

8. A non-linear editing system, comprising:
   a source file repository that stores media source files copied from a plurality of memory cards;
   a proxy file generator that generates and stores a compressed low-resolution, low bit rate proxy of media source files stored in the source file repository;
   an editing station including a web browser having a display screen;
   an ingestion station including a web browser having a display screen and a memory card reader; and
   at least one digital processor interactively connected to the source file repository, the proxy file generator, the editing station and the ingestion station that automatically generates a proxy file of each media source file copied into one of the card folders, and makes the proxy file available for editing on the display screen of the editing station,
   wherein the at least one digital processor generates a periodic folder at a preselected time interval.

9. The non-linear editing system defined in claim 8, wherein each of the storage devices further stores a date and time for every file recorded therein, and the at least one digital processor automatically generates a unique card folder within the periodic folder for the contents of each memory card imported into the source file repository, and automatically identifies and copies only the media source files contained within the storage device that were made within the preselected time interval associated with the periodic folder.

10. The non-linear editing system defined in claim 9, wherein each of the storage devices further bears an identifier, and wherein the at least one digital processor automatically groups all of the card folders within the periodic folder containing source files associated with the identifier.

11. The non-linear editing system defined in claim 9, wherein the at least one digital processor compares the ending time of the last file copied into each card folder with the beginning time of the first file copied into each card folder and groups together all of the card folders where the ending and beginning times differ by less than a preselected time period.

12. A non-linear editing system, comprising:
   a source file repository that stores media source files copied from a plurality of memory cards;
   a proxy file generator that generates and stores a compressed low-resolution, low bit rate proxy of media source files stored in the source file repository;
   an editing station including a web browser having a display screen;
   an ingestion station including a web browser having a display screen and a memory card reader; and
   at least one digital processor interactively connected to the source file repository, the proxy file generator, the editing station and the ingestion station that automatically generates a proxy file of each media source file copied into one of the card folders, and makes the proxy file available for editing on the display screen of the editing station,
   wherein the non-linear editing system includes more than one ingestion station and editing station.

13. A non-linear editing system, comprising:
   a source file repository that stores media source files copied from a plurality of memory cards;
   a proxy file generator that generates and stores a compressed low-resolution, low bit rate proxy of media source files stored in the source file repository;
   an editing station including a web browser having a display screen;
   an ingestion station including a web browser having a display screen and a memory card reader; and
   at least one digital processor interactively connected to the source file repository, the proxy file generator, the editing station and the ingestion station that automatically generates a proxy file of each media source file copied into one of the card folders, and makes the proxy file available for editing on the display screen of the editing station, wherein the at least one digital processor generates and transmits an electronic message to one or more preselected persons of interest upon the detection of a preselected identifier associated with a memory card.

14. A non-linear editing system, comprising:

a source file repository that stores media source files copied from a plurality of memory cards; a proxy file generator that generates and stores a compressed low-resolution, low bit rate proxy of media source files stored in the source file repository;

an editing station including a web browser having a display screen;

an ingestion station including a web browser having a display screen; and at least one digital processor interactively connected to the source file repository, the proxy file generator, the editing station and the ingestion station that automatically creates a database record associating each ingested source file with its corresponding proxy file and thumbnail file, generates a proxy file of each media source file copied into one of the card folders, and generates a thumbnail image of the media source file for display on the display screen of the editing station, wherein the at least one digital processor creates a story folder within the source file repository having one uniquely named card folder for each of the memory cards to be imported.

15. The non-linear editing system defined in claim 14, wherein the at least one digital processor automatically generates a same number of uniquely-named card folders in the story folder as the number of memory cards with related content that are copied.

16. The non-linear editing system defined in claim 14, wherein the ingestion station includes a card monitor that signals the at least one digital processor whenever a new memory card is connected to the card reader, and wherein the at least one digital processor automatically generates a new uniquely named card folder within either a preexisting or a newly generated story folder and then automatically proceeds to copy the file contents of the memory card into the new card folder.

17. The non-linear editing system defined in claim 14, wherein the at least one digital processor generates a periodic folder at a preselected time interval.

18. The non-linear editing system defined in claim 17, wherein each of the storage devices further stores a date and time for every file recorded therein, and the at least one digital processor automatically generates a unique card folder within the periodic folder for the contents of each memory card imported into the source file repository, and automatically identifies and copies only the media source files contained within the storage device that were made within the preselected time interval associated with the periodic folder.

19. A non-linear editing system, comprising:

a source file repository that stores media source files copied from a plurality of memory cards; a proxy file generator that generates and stores a compressed low-resolution, low bit rate proxy of media source files stored in the source file repository;

an editing station including a web browser having a display screen;

an ingestion station including a web browser having a display screen; and at least one digital processor interactively connected to the source file repository, the proxy file generator, the editing station and the ingestion station that automatically creates a database record associating each ingested source file with its corresponding proxy file and thumbnail file, generates a proxy file of each media source file copied into one of the card folders, and generates a thumbnail image of the media source file for display on the display screen of the editing station, wherein the at least one digital processor generates and transmits an electronic message to one or more preselected persons of interest upon the detection of a preselected identifier associated with a memory card.

* * * * *